Feb. 3, 1959     A. W. GAUBATZ     2,871,829
SERVOMOTOR WITH FLOATING CONTROL LINKAGE
Filed Nov. 30, 1955     3 Sheets-Sheet 1
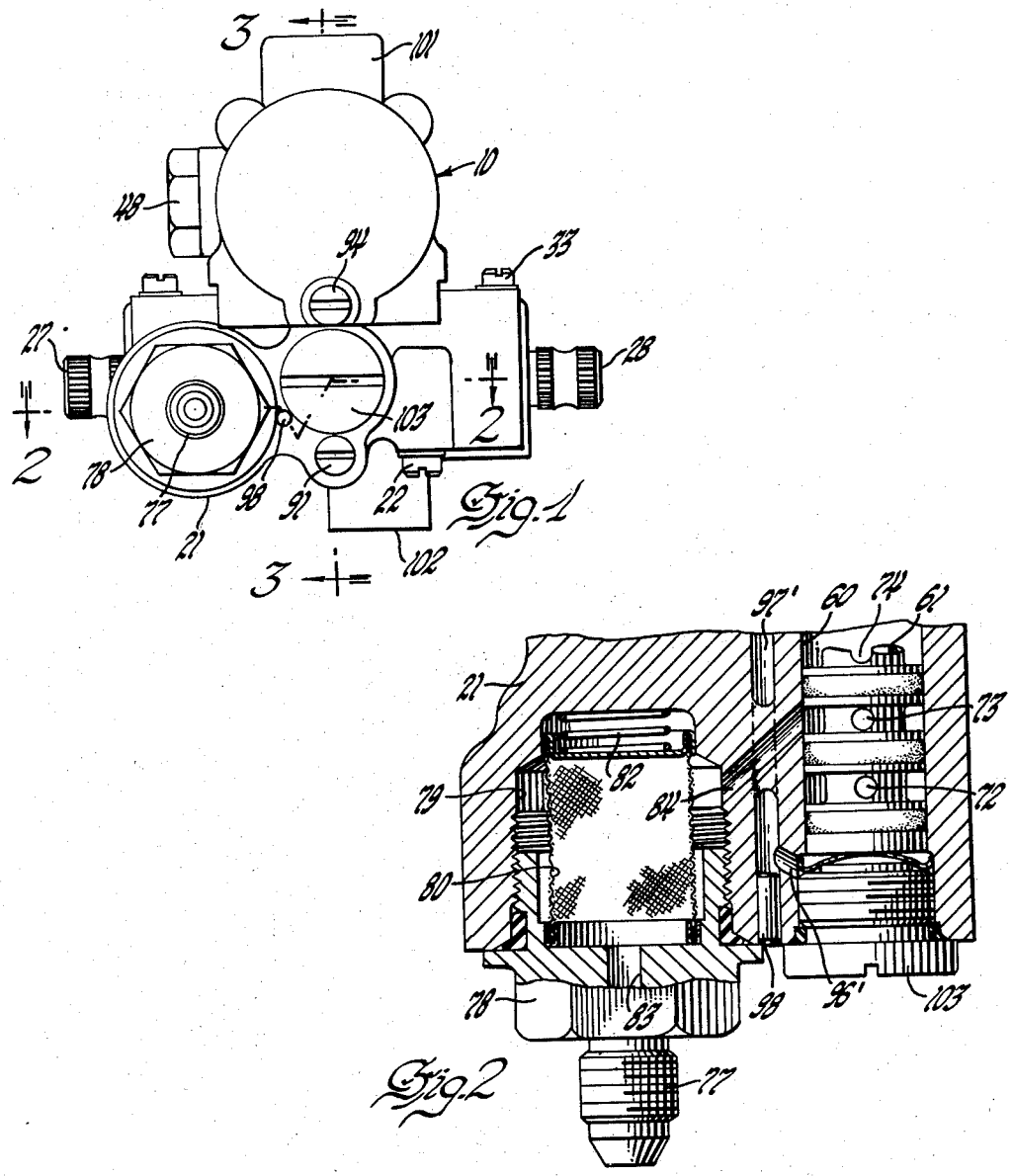
INVENTOR.
Arthur W. Gaubatz
BY
Paul Fitzpatrick
ATTORNEY

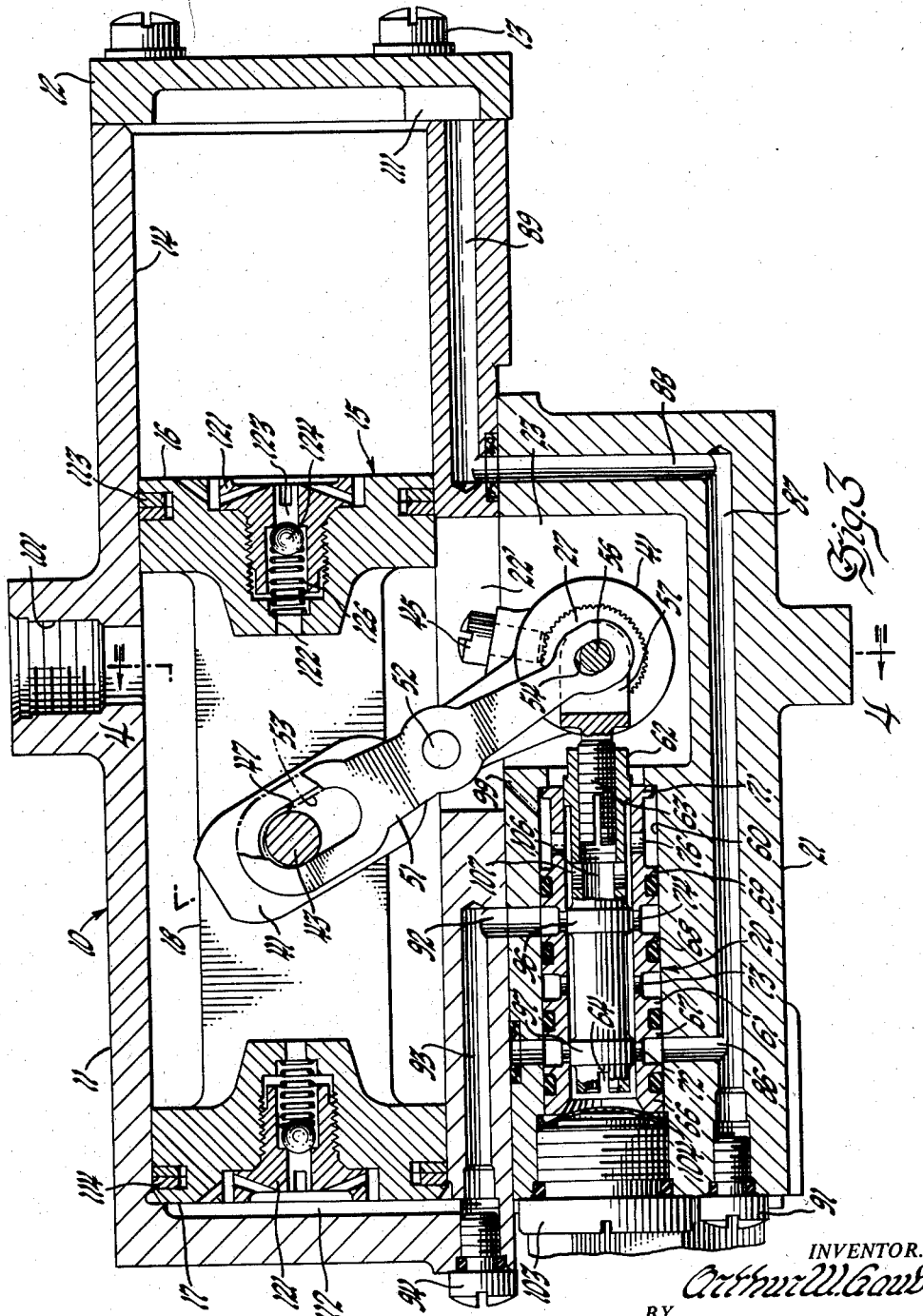

United States Patent Office 2,871,829
Patented Feb. 3, 1959

2,871,829

SERVOMOTOR WITH FLOATING CONTROL LINKAGE

Arthur W. Gaubatz, Indianapolis, Ind., assignor to General Motors Corporation, Detroit, Mich., a corporation of Delaware Application November 30, 1955, Serial No. 550,073

4 Claims. (Cl. 121—41)

My invention relates to power actuators and follow-up devices, commonly called servomotors.

The servomechanism of the invention is of the type in which power is exerted by a fluid pressure operated cylinder and piston preferably energized by liquid under pressure. The piston drives a power output under the control of a valve which responds to any difference between the position of the output and the position of an input. The input may be operated with very little force and the output will follow the movements of the input and will be driven by whatever force is desired, depending upon the hydraulic pressure and the dimensions of the mechanism.

Features of the invention lie in structural arrangements which are principally directed to providing a simple, accurate, and dependable servomotor. A feature of particular interest is the arrangement by which the input and output are coupled to the servo valve. Another feature of interest lies in the provision of relief valves in the piston which will prevent development of excessive pressures in the cylinder due to seepage through the valve.

The principal object of the invention is to provide an improved servomechanism which is compact, reliable, and accurate in response. A further object of the invention is to provide a power actuator which is protected against excessive pressures.

The nature of the invention and the advantages thereof will be apparent to those skilled in the art from the succeeding detailed description of the preferred embodiment of the invention and the accompanying drawings in which:

Figure 1 is an end elevation of a servomechanism;

Figure 2 is a fragmentary sectional view taken on the plane indicated by the line 2—2 in Figure 1;

Figure 3 is a longitudinal sectional view taken on the plane indicated by the line 3—3 in Figure 1.

Figure 4:
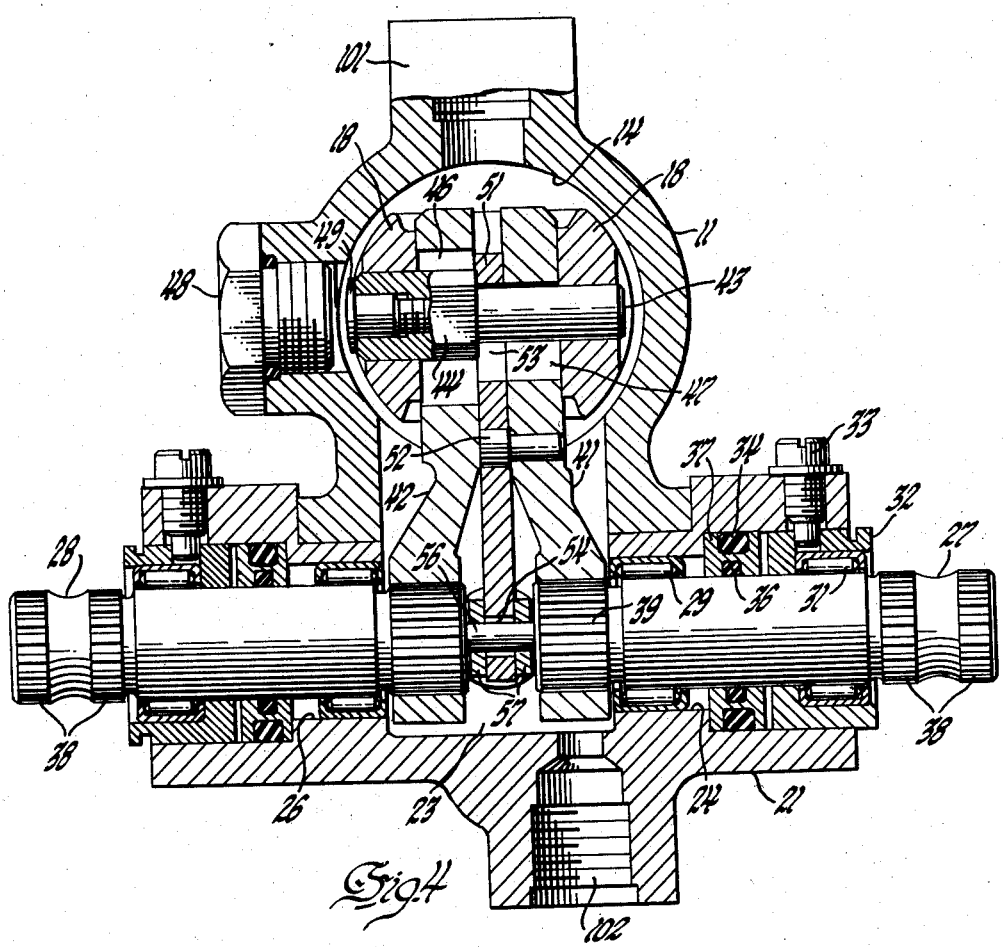
Figure 4 is a transverse sectional view taken on the plane indicated by the line 4—4 in Figure 3.

Referring first to Figures 1 and 3, the servomotor comprises a motor or cylinder assembly 10 including a cylinder 11, one end of which is integral and the other end of which is closed by a head 12 attached by cap screws 13. Mounted within the internal bore 14 of the cylinder is a piston 15 having rather widely spaced heads or faces 16 and 17 joined by two integral struts 18. The movement of the piston is controlled by a control device, specifically a servo valve assembly 20 mounted in a valve housing 21 fixed by cap screws 22, one of which is shown in Figure 1, to the cylinder body. An opening 22' in the lower wall of the cylinder opens into a chamber 23 in the valve housing. Coaxial bores 24 and 26 (Figure 4) extend through the valve housing from the chamber 23 at right angles to the axis of cylinder 14. An input shaft 27 and a coaxial output shaft 28 are rotatably mounted in the bores 24 and 26. These shafts are coupled to the piston 15 and to the valve 20.

The arrangements for mounting the shafts 27 and 28 and for sealing the housing where the shafts extend through it are identical for the two shafts. Therefore, only the arrangements for shaft 27 will be described. It is supported by an inner needle bearing 29 fitted in bore 24 and an outer needle bearing 31 mounted in a retainer 32 held in place in the bore 24 by threaded radial pin 33. Sealing is effected by outer and inner O-rings 34 and 36 in grooves in a ring 37 mounted in the bore and abutting the shoulder therein. The outer ends of shafts 27 and 28 are provided with splines or serrations 38 for attachment of input and output arms (not shown) or other motion transmitting means. The inner ends of the shafts are serrated as indicated at 39 to receive an input or control arm 41 on input shaft 27 and an output or driven arm 42 on shaft 28. The arms are fixed on the shafts by screws 45. These arms extend upwardly through the opening 22' in the cylinder wall and are coupled to the piston by a piston pin 43 extending between the struts 18.

Piston pin 43 is rotatably mounted in the piston. One end of the pin is of larger diameter than the other. The larger end is formed with flats 44 on each side thereof which engage the walls of a radial slot 46 in output arm 42. The smaller diameter portion of the piston pin extends through a radial slot 47 in the input arm. The radial slots are required to accommodate the variation in distance between the piston pin and the axis of the shafts as the piston reciprocates. A removable plug 48 in the cylinder wall provides for installation of the piston pin and a stud 49 in the pin which bears against the cylinder wall to hold the pin in place.

Slot 47 is slightly wider than the diameter of the piston pin so that input shaft 27 can move slightly without displacement of the piston to provide the error sense which controls the servo valve. In a practical example, the input shaft has about one degree of arc of free movement relative to the piston.

The mechanism by which the valve is controlled includes a floating lever 51 mounted between the input and output arms 41 and 42 and rotatable on the head of a pin 52 pressed into the input arm 41. A slot 53 in the control lever receives the piston pin 43 with only sufficient clearance for smooth operation. The lower end of control lever 51 has a slightly elongated opening 54 for a transverse pin 56 mounted in a clevis fitting 57 constituting an input member coupled to the servo valve 20.

In the normal or balanced condition of the mechanism pin 43 is equally spaced from both walls of slot 47 in the input arm. Control lever 51 is radial with respect to the input and output shafts, and pin 56 is coaxial with these shafts. In this condition, the servo valve is in its neutral position as will be described. If the input shaft 27 is turned, arm 41 moves and pin 43 swings control lever 51 about pin 52, displacing pin 56 to the right or left as viewed in Figure 3. The resulting displacement of the valve controls a supply of pressure fluid to the piston to effect the follow up movement which will continue until piston pin 43 is again centered with respect to the input arm, thereby centering pin 56 with the input shafts. The input and output shafts will then be in the same angular position.

Considering now the valve and the hydraulic circuits of the servomechanism, valve assembly 20 comprises a sleeve 61 mounted in a bore 60 in valve housing 21 parallel to cylinder 14 and a movable valve member or spool 62 which is internally threaded to receive the threaded stem 63 of clevis fitting 57. The threaded stem 63 is slotted to provide an interference fit with the threads in the valve spool. The outer end of the valve spool has a screwdriver slot 64 so that the spool may be turned to align the spool with the valve ports. The interference fit of the threads preserves the adjustment. Valve sleeve 61 is formed with four lands 66, 67, 68 and 69 engaging the bore in the housing, each land being grooved for an O-ring seal. A flange 71 on the sleeve engages a shoulder in the bore. Fluid entrance and discharge ports are defined by transverse bores 72, 73, 74 and 76 between the lands and between land 69 and the flange 71.

Actuating fluid, which may be any suitable fluid under pressure and in particular may be fuel under pressure supplied by an engine fuel pump, is supplied by a conduit (not shown) which connects to a threaded fitting 77 (Figures 1 and 2) on a plug 78 which threads into a cavity 79 in the end of the valve housing at one side of the valve. A suitable screen or filter 80 is retained in chamber 79, one end engaging a recess in plug 78 and the other end engaging a coil spring 82 which bears against the bottom of the cavity 79. The fluid enters the filter through a passage 83 in the plug and after passing through the filter flows to the valve through a drilled passage 84 which intersects the wall of bore 60 at a point which communicates through ports 73 with the interior of valve sleeve 61. The right hand end of the cylinder as viewed in Figure 3 communicates with the valve through supply and return ports 72 and drilled passages 86, 87, 88 and 89 extending through the valve housing and the wall of the cylinder. A threaded plug 91 closes the open end of passage 87. The left end of the cylinder as viewed in Figure 3 is connected to the valve through supply and return ports 74 and drilled passages 92 and 93, the latter being closed by plug 94 at the end of the cylinder. The valve spool is formed with lands 96 and 97 which, when the valve is centered, close ports 72 and 74. Movement of the valve in either direction will uncover one of the ports to supply the piston and move it accordingly. This same movement will connect the other of ports 72 and 74 with one end of the valve sleeve 61 and thus to the exhaust or drain conduit. Fluid may escape from either end of the valve. As shown in Figure 2, a passage 96' communicates with passage 97' in the valve housing parallel to the valve which continues into the chamber 23. A plug 98 closes the outer end of passage 97. Fluid escaping from ports 74 may flow between the valve spool and valve sleeve to ports 76 which communicate with passages 99 (Figure 3) opening into chamber 23. Chamber 23, the opening 22' in the cylinder and the space between the two faces of the piston are connected to a drain line through a threaded boss 101 in the cylinder wall at the center thereof or a drain connection 102 from the chamber 23. Either one or, if desired, both of these may be connected to a return line which carries off fluid exhausted from the cylinder through the valve and also any fluid which may leak past the piston or through the valve.

Valve sleeve 61 is held in place by threaded plug 103 and a wavy washer 104 between the plug and the end of the valve sleeve.

It may be noted also that a passage 106 extends through the valve spool and is connected through radial ports 107 with the interior of the valve sleeve. Fluid returning from the cylinder may thus exhaust from either end of the valve sleeve and the two ends are in communication through the valve spool. This prevents any unbalanced forces on the valve spool which might disturb the sensitivity of the servomechanism.

Considering now the cylinder and piston, including the relief valves in the piston, fluid is admitted to and returned from the cylinder by spaces or passages 111 and 112 in the ends of the cylinder. The piston, as previously stated, is a unitary structure with heads or faces 16 and 17 joined by struts 18. Piston rings 113 and 114 in the heads seal against fluid leakage. It will be apparent that the pressure chambers are in the ends of the cylinder with the exhaust or return chamber between the two piston heads. Identical relief valves are mounted in the two piston heads. Each comprises a cage 121 threaded into a stepped bore 122 extending through the head. The cage has an enlarged head which seats against a shoulder in the bore. A passage 123 through the cage is normally closed by ball 124 urged against it by compression spring 126 abutting a shoulder in bore 122. The relief valves provide means to limit the pressure exerted on the piston and thereby the force exerted by the servomechanism. This is particularly desirable where the servomotor is actuated by fluid of variable pressure and the exertion of too much force by the servomotor might be harmful to the mechanism driven by it. With the relief valves set to open at some predetermined pressure, the piston force will be determined by its area and this value of pressure. Otherwise, excessive pressures might be built up because of resistance to follow-up movement by the driven device or because of seepage of motive fluid through the servo valve.

It is believed that the mode of operation of the device will be apparent from the foregoing step by step description of the structure and operation of the parts, but it may be reviewed briefly. Assume, for example, that the input and output are at the same position and the valve is thus centered, and that the piston is at the left end of the cylinder as shown in Figure 3. Assuming then that the input shaft 27, the end of which is seen in Figure 3, moves slightly clockwise, control lever 51 will be swung slightly counter-clockwise about pin 43 and will pull the valve spool to the right. Pressure fluid may then flow from the inlet through passages 73, the interior of the valve sleeve, and passages 74, 92, 93 and 112 to move the piston to the right. The right end of the cylinder is connected through passages 111, 89, 88, 87, 86 and 72 to the left end of the valve sleeve, the left edge of ports 86 being uncovered by land 97 on the valve spool. This fluid then may flow through passages 96' and 97' into chamber 23 and to the drain connection. Fluid flow continues and the piston moves to the right until the piston pin is shifted sufficiently to move the valve back to its neutral position by swinging lever 51 clockwise. The input and output shafts are again in alignment. The piston will follow a continuous movement of the input as long as there is a slight lead between the input and output. By making the lands 96 and 97 of substantially the same width as ports 72 and 74, the lag or error can be reduced to a very small amount. The operation of the follow-up in the reverse direction will be obvious.

If there should be a failure of supply of the actuating fluid, the output shaft can be moved directly by the input shaft provided sufficient force is available, which may be the case in certain installations as, for example, where the servomechanism is provided between a manual control device and a driven device to reduce the manual effort required. Since the input shaft is coupled (with some lost motion) through arm 41 to the piston pin, it may bodily move the piston and with it the output shaft.

The advantages of the invention will be apparent from the preceding description of the preferred embodiment. This description is not to be construed as limiting the invention, since many modifications may be made by the exercise of skill in the art without departing from the principles of the invention.

I claim:

1. A servomotor comprising a cylinder, a piston reciprocable therein, a piston pin mounted in the piston transversely to the axis of the cylinder, coaxial input and output shafts parallel to the piston pin, an input arm on the input shaft engaging the piston pin with slight freedom for rotary movement of the input shaft, an output arm on the output shaft engaging the piston pin, a control lever rotatively engaging the piston pin and rotatively connected to the input arm between the piston pin and the input shaft, a servo valve supplying the cylinder, and a coupling between the servo valve and the control lever at the axis of the input shaft to shift the servo valve in response to relative movement of the said shafts.

2. A servomotor comprising a cylinder, a piston reciprocable therein, a piston pin mounted in the piston transversely to the axis of the cylinder, coaxial input and output shafts parallel to the piston pin, an input arm on the input shaft engaging the piston pin with slight freedom for rotary movement of the input shaft, an output arm on the output shaft engaging the piston pin, a control lever rotatively engaging the piston pin and rotatively connected to the input arm between the piston pin and the input shaft, a servo valve supplying the cylinder, a coupling between the servo valve and the control lever at the axis of the input shaft to shift the servo valve in response to relative movement of the said shafts, and relief valve means in the piston to relieve pressure above a predetermined value in the cylinder.

3. A servomotor comprising a cylinder, a piston reciprocable therein, coaxial input and output shafts normal to the cylinder axis, an input arm on the input shaft directly coupled to the piston with slight freedom for rotary movement of the input shaft, an output arm on the output shaft directly coupled to the piston, a control lever rotatively coupled to the piston and rotatively connected to the input arm, the two arms and the lever having a common axis of coupling to the piston, the lever being connected to the input arm at a point spaced from the said common axis, a servo valve supplying the cylinder, and a coupling between the servo valve and the control lever at the axis of the input shaft to shift the servo valve in response to relative movement of the said shafts.

4. A servomotor comprising a cylinder, a piston reciprocable therein, a piston pin mounted in the piston transversely to the axis of the cylinder, coaxial input and output shafts parallel to the piston pin, an input arm on the input shaft, an output arm on the output shaft having a slot therein radial to the shaft, the piston pin passing through the slot in the output arm and engaging the walls thereof to drive the output arm and shaft, a control lever pivotally mounted on the input arm at a point between the piston pin and the input shaft, the control lever having a slot therein extending longitudinally thereof with the walls of the slot engaging the piston pin, a servo valve supplying the cylinder, and a coupling between the servo valve and the control lever at the axis of the input shaft to shift the servo valve in response to relative movement of the said shafts.

References Cited in the file of this patent

UNITED STATES PATENTS

| | | |
|---|---|---|
| 1,001,340 | Blauvelt | Aug. 22, 1911 |
| 2,265,817 | Rockwell | Dec. 9, 1941 |
| 2,388,185 | Rodway | Oct. 30, 1945 |
| 2,487,113 | Doyle | Nov. 8, 1949 |